US010530650B2

(12) United States Patent
Thakkar et al.

(10) Patent No.: US 10,530,650 B2
(45) Date of Patent: Jan. 7, 2020

(54) CROSS-CLOUD POLICY MANAGEMENT FOR HYBRID CLOUD DEPLOYMENTS

(71) Applicant: VMWARE, INC., Palo Alto, CA (US)

(72) Inventors: Sachin Thakkar, Palo Alto, CA (US); Debashis Basak, Palo Alto, CA (US); Serge Maskalik, Palo Alto, CA (US); Aravind Srinivasan, Pune (IN); Abhinav Vijay Bhagwat, Pune (IN)

(73) Assignee: VMware, Inc., Palo Alto, CA (US)

( * ) Notice: Subject to any disclaimer, the term of this patent is extended or adjusted under 35 U.S.C. 154(b) by 313 days.

(21) Appl. No.: 14/641,314

(22) Filed: Mar. 7, 2015

(65) Prior Publication Data

US 2016/0105321 A1    Apr. 14, 2016

Related U.S. Application Data

(60) Provisional application No. 62/063,373, filed on Oct. 13, 2014.

(30) Foreign Application Priority Data

Dec. 31, 2014    (IN) .......................... 6853/CHE/2014

(51) Int. Cl.
    *G06F 15/16* (2006.01)
    *H04L 12/24* (2006.01)
    *H04L 29/08* (2006.01)
    *G06F 9/455* (2018.01)

(52) U.S. Cl.
    CPC .. *H04L 41/0853* (2013.01); *G06F 2009/4557* (2013.01); *H04L 67/10* (2013.01); *Y02D 30/30* (2018.01)

(58) Field of Classification Search
    CPC ... H04L 41/0853; H04L 67/10; G06F 9/5061; G06F 9/45533; G06F 2009/4557; G06F 2009/4554; G06F 2009/4562
    See application file for complete search history.

(56) References Cited

U.S. PATENT DOCUMENTS

| 9,781,052 B2 * | 10/2017 | Narayanasamy ....... H04L 47/70 |
| 9,917,865 B2 * | 3/2018 | Arora .................. H04L 65/1069 |
| 2005/0066033 A1 * | 3/2005 | Cheston .................. H04L 29/06 709/225 |
| 2011/0185063 A1 * | 7/2011 | Head ..................... G06F 9/5077 709/226 |
| 2012/0281708 A1 * | 11/2012 | Chauhan ............. H04L 63/0272 370/401 |

(Continued)

*Primary Examiner* — Douglas B Blair
(74) *Attorney, Agent, or Firm* — Loza & Loza, LLP

(57) ABSTRACT

A method is provide for managing a migration of a virtual machine from a private data center managed by a first organization to a public cloud computing system by a second organization and where the first organization is a tenant. The configurations of physical infrastructure of the private data center that underlies the virtual machine are determined, along with a corresponding match preference indicating a level of criticality for some corresponding configuration at the public cloud system. The configurations and match preferences generated as part of a migration package. The public cloud computing system instantiates a corresponding VM based on the determined configurations and corresponding match preferences.

12 Claims, 3 Drawing Sheets

(56) References Cited

U.S. PATENT DOCUMENTS

| | | | |
|---|---|---|---|
| 2013/0283364 A1* | 10/2013 | Chang | H04L 49/70 726/12 |
| 2014/0040892 A1* | 2/2014 | Baset | G06F 9/455 718/1 |
| 2014/0108665 A1* | 4/2014 | Arora | H04L 67/141 709/227 |
| 2014/0208320 A1* | 7/2014 | Huang | G06F 8/63 718/1 |
| 2014/0280948 A1* | 9/2014 | Schmidt | H04L 47/827 709/226 |
| 2015/0058459 A1* | 2/2015 | Amendjian | H04L 41/5058 709/223 |
| 2015/0058486 A1* | 2/2015 | Huang | H04L 47/70 709/226 |
| 2015/0074279 A1* | 3/2015 | Maes | G06F 9/5072 709/226 |
| 2015/0172222 A1* | 6/2015 | Liao | H04L 49/356 370/392 |
| 2015/0172331 A1* | 6/2015 | Raman | H04L 65/403 709/204 |
| 2015/0324215 A1* | 11/2015 | Borthakur | G06F 9/45558 718/1 |
| 2016/0036643 A1* | 2/2016 | Nair | H04L 12/4641 370/255 |
| 2017/0134246 A1* | 5/2017 | Amendjian | H04L 41/5058 |

* cited by examiner

CROSS-CLOUD POLICY MANAGEMENT FOR HYBRID CLOUD DEPLOYMENTS

CROSS-REFERENCE TO RELATED APPLICATION(S)

This application claims the benefit of U.S. Provisional Patent Application No. 62/063,373, filed Oct. 13, 2014 and also under 35 U.S.C. 119(a)-(d) to Foreign application Serial No. 6853/CHE/2014 filed in India entitled "CROSS-CLOUD POLICY MANAGEMENT FOR HYBRID CLOUD DEPLOYMENTS", on Dec. 31, 2014, by VMware, Inc., the entire contents of which are incorporated by reference herein.

BACKGROUND

Cloud architectures are used in cloud computing and cloud storage systems for offering infrastructure-as-a-service (IaaS) cloud services. Examples of cloud architectures include the VMware vCloud™ Director cloud architecture software, Amazon EC2™ web service, and OpenStack™ open source cloud computing service, IaaS cloud service is a type of cloud service that provides access to physical and/or virtual resources in a cloud environment. These services provide a tenant application programming interface (API) that supports operations for manipulating IaaS constructs such as virtual machines (VMs) and logical networks. However, the use of such public cloud services is typically kept separate from the use of existing computing resources in data centers managed by an enterprise.

SUMMARY

Embodiments of the present disclosure provide a method for managing a hybrid cloud computing system. The method includes receiving a request to migrate a virtual machine from a private data center managed by a first organization to a public cloud computing system. The first organization is a tenant in the public cloud computing system managed by a second organization. The method further includes determining configurations of physical infrastructure of the private data center that underlies the virtual machine, and determining a match preference associated with each of the configurations. The match preferences indicate a level of criticality for some corresponding configuration at the public cloud system. The method includes transmitting, to the public cloud computing system, a migration package associated with the virtual machine and specifying the determined configurations and corresponding match preferences.

Another embodiment of the present disclosure provides a non-transitory computer-readable storage medium comprising instructions that, when executed in a computing device, manage a hybrid cloud computing system, by performing the steps of receiving a request to migrate a virtual machine from a private data center managed by a first organization to a public cloud computing system, wherein the first organization is a tenant in the public cloud computing system managed by a second organization. The steps include determining configurations of physical infrastructure of the private data center that underlies the virtual machine, and determining a match preference associated with each of the configurations. The match preferences indicate a level of criticality for some corresponding configuration at the public cloud system. The steps further include transmitting, to the public cloud computing system, a migration package associated with the virtual machine and specifying the determined configurations and corresponding match preferences.

Another embodiments of the present disclosure provides a method for managing a hybrid cloud computing system. The method includes receiving, at a public cloud computing system, a migration package associated with a first virtual machine at a private data center managed by a first organization. The first organization is a tenant in the public cloud computing system managed by a second organization. The method further includes retrieving a plurality of configurations and corresponding match preferences from the migration package. The match preferences indicate a level of criticality for some corresponding configuration at the public cloud system. The method includes, responsive to determining availability for the plurality of configurations at the public cloud computing system based on the corresponding match preferences, instantiating a second virtual machine based on the migration package.

BRIEF DESCRIPTION OF THE DRAWINGS

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
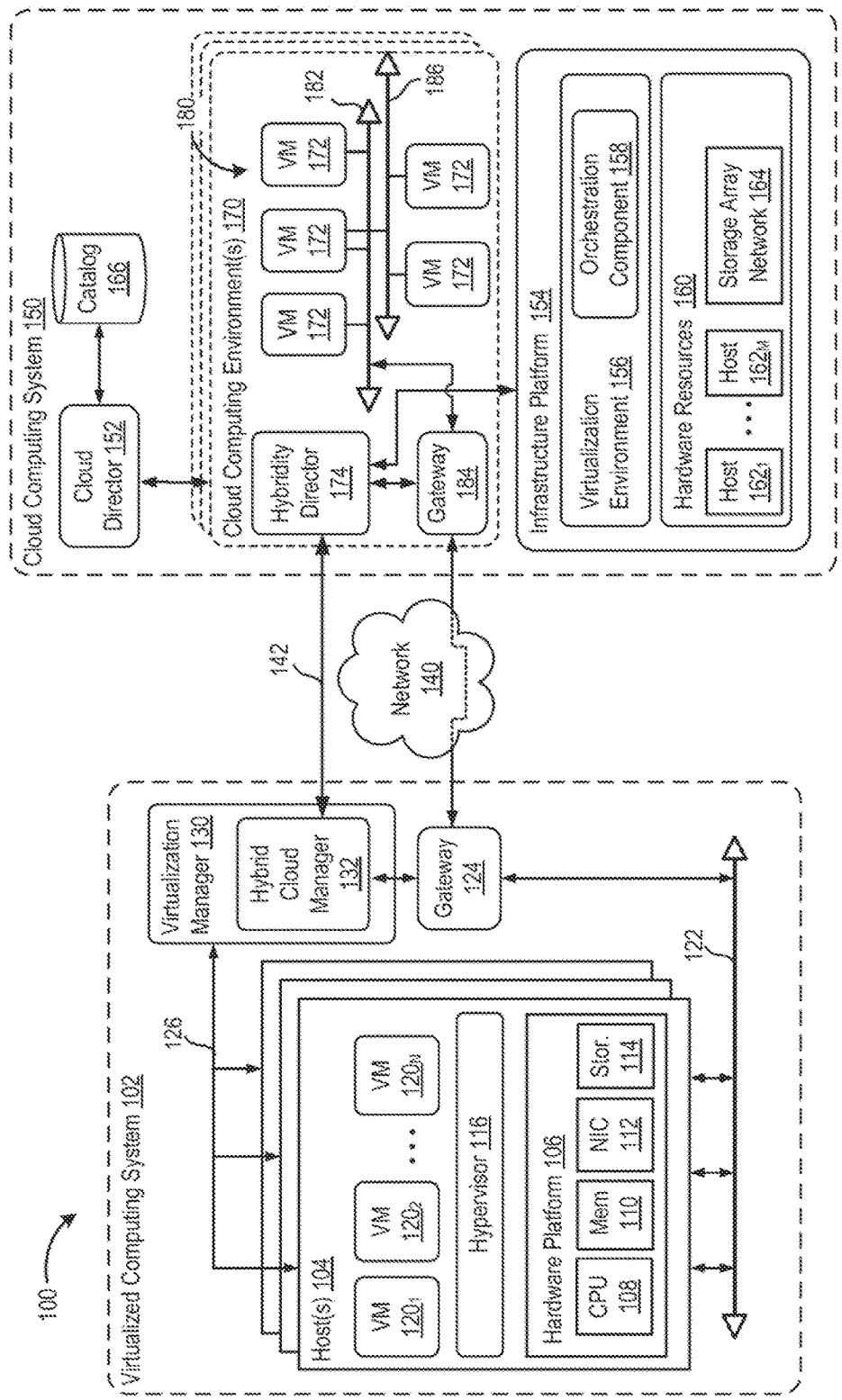
FIG. 1 is a block diagram that illustrates a computer system in which one or more embodiments may be utilized.

FIG. 1 is a block diagram of a hybrid cloud computing system 100 in which one or more embodiments of the present disclosure may be utilized. Hybrid cloud computing system 100 includes a virtualized computing system 102 and a cloud computing system 150, and is configured to provide a common platform for managing and executing virtual workloads seamlessly between virtualized computing system 102 and cloud computing system 150. In one embodiment, virtualized computing system 102 may be a data center controlled and administrated by a particular enterprise or business organization, while cloud computing system 150 is operated by a cloud computing service provider and exposed as a service available to account holders, such as the particular enterprise in addition to other enterprises. As such virtualized computing system 102 may sometimes be referred to as an on-premise data center(s), and cloud computing system 150 may be referred to as a "public" cloud service. In some embodiments, virtualized computing system 102 itself may be configured as a private cloud service provided by the enterprise.

As used herein, an internal cloud or "private" cloud is a cloud in which a tenant and a cloud service provider are part of the same organization, while an external or "public" cloud is a cloud that is provided by an organization that is separate from a tenant that accesses the external cloud. For example, the tenant may be part of an enterprise, and the external cloud may be part of a cloud service provider that is separate from the enterprise of the tenant and that provides cloud services to different enterprises and/or individuals. In embodiments disclosed herein, a hybrid cloud is a cloud architecture in which a tenant is provided with seamless access to both private cloud resources and public cloud resources.

Virtualized computing system 102 includes one or more host computer systems 104. Hosts 104 may be constructed on a server grade hardware platform 106, such as an x86 architecture platform, a desktop, and a laptop. As shown, hardware platform 106 of each host 104 may include conventional components of a computing device, such as one or more processors (CPUs) 108, system memory 110, a network interface 112, storage 114, and other I/O devices such as, for example, a mouse and keyboard (not shown). Processor 108 is configured to execute instructions, for example, executable instructions that perform one or more operations described herein and may be stored in memory 110 and in local storage. Memory 110 is a device allowing information, such as executable instructions, cryptographic keys, virtual disks, configurations, and other data, to be stored and retrieved. Memory 110 may include, for example, one or more random access memory (RAM) modules. Network interface 112 enables host 104 to communicate with another device via a communication medium, such as a network 122 within virtualized computing system 102. Network interface 112 may be one or more network adapters, also referred to as a Network Interface Card (NIC). Storage 114 represents local storage devices (e.g., one or more hard disks, flash memory modules, solid state disks, and optical disks) and/or a storage interface that enables host 104 to communicate with one or more network data storage systems. Examples of a storage interface are a host bus adapter (HBA) that couples host 104 to one or more storage arrays, such as a storage area network (SAN) or a network-attached storage (NAS), as well as other network data storage systems.

Each host 104 is configured to provide a virtualization layer that abstracts processor, memory, storage, and networking resources of hardware platform 106 into multiple virtual machines $120_1$ to $120_N$ (collectively referred to as VMs 120) that run concurrently on the same hosts. VMs 120 run on top of a software interface layer, referred to herein as a hypervisor 116, that enables sharing of the hardware resources of host 104 by VMs 120. One example of hypervisor 116 that may be used in an embodiment described herein is a VMware ESXi hypervisor provided as part of the VMware vSphere solution made commercially available from VMware, Inc. Hypervisor 116 may run on top of the operating system of host 104 or directly on hardware components of host 104.

Virtualized computing system 102 includes a virtualization management module (depicted in FIG. 1 as virtualization manager 130) that may communicate to the plurality of hosts 104 via a network, sometimes referred to as a management network 126. In one embodiment, virtualization manager 130 is a computer program that resides and executes in a central server, which may reside in virtualized computing system 102, or alternatively, running as a VM in one of hosts 104. One example of a virtualization management module is the vCenter® Server product made available from VMware, Inc. Virtualization manager 130 is configured to carry out administrative tasks for computing system 102, including managing hosts 104, managing VMs 120 running within each host 104, provisioning VMs, migrating VMs from one host to another host, and load balancing between hosts 104.

In one embodiment, virtualization manager 130 includes a hybrid cloud management module (depicted as hybrid cloud manager 132) configured to manage and integrate virtual computing resources provided by cloud computing system 150 with virtual computing resources of computing system 102 to form a unified "hybrid" computing platform. Hybrid cloud manager 132 is configured to deploy VMs in cloud computing system 150, transfer VMs from virtualized computing system 102 to cloud computing system 150, and perform other "cross-cloud" administrative task, as described in greater detail later. In one implementation, hybrid cloud manager 132 is a module or plug-in complement to virtualization manager 130, although other implementations may be used, such as a separate computer program executing, in a central server or running in a VM in one of hosts 104.

In one embodiment, hybrid cloud manager 132 is configured to control network traffic into network 122 via a gateway component (depicted as a gateway 124). Gateway 124 (e.g., executing as a virtual appliance) is configured to provide VMs 120 and other components in virtualized computing system 102 with connectivity to an external network 140 (e.g., Internet). Gateway 124 may manage external public IP addresses for VMs 120 and route traffic incoming to and outgoing from virtualized computing system 102 and provide networking services, such as firewalls, network address translation (NAT), dynamic host configuration protocol (DHCP), load balancing, and virtual private network (VPN) connectivity over a network 140.

In one or more embodiments, cloud computing system 150 is configured to dynamically provide an enterprise (or users of an enterprise) with one or more virtual data centers 180 in which a user may provision VMs 120, deploy multi-tier applications on VMs 120, and/or execute workloads. Cloud computing system 150 includes an infrastructure platform 154 upon which a cloud computing environment 170 may be executed. In the particular embodiment of FIG. 1, infrastructure platform 154 includes hardware resources 160 having computing resources (e.g., hosts $162_1$ to $162_N$), storage resources (e.g., one or more storage array systems, such as SAN 164), and networking resources, which are configured in a manner to provide a virtualization environment 156 that supports the execution of a plurality of virtual machines 172 across hosts 162. It is recognized that hardware resources 160 of cloud computing system 150 may in fact be distributed across multiple data centers in different locations.

Each cloud computing environment 170 is associated with a particular tenant of cloud computing system 150, such as the enterprise providing virtualized computing system 102. In one embodiment, cloud computing environment 170 may be configured as a dedicated cloud service for a single tenant comprised of dedicated hardware resources 160 (i.e., physically isolated from hardware resources used by other users of cloud computing system 150). In other embodiments, cloud computing environment 170 may be configured as part of a multi-tenant cloud service with logically isolated virtual computing resources on a shared physical infrastructure. As shown in FIG. 1, cloud computing system 150 may support multiple cloud computing environments 170, available to multiple enterprises in single-tenant and multi-tenant configurations.

In one embodiment, virtualization environment 156 includes an orchestration component 158 (e.g., implemented as a process running in a VM) that provides infrastructure resources to cloud computing environment 170 responsive to provisioning requests. For example, if enterprise required a specified number of virtual machines to deploy a web applications or to modify scale) a currently running web application to support peak demands, orchestration component 158 can initiate and manage the instantiation of virtual machines (e.g., VMs 172) on hosts 162 to support such requests. In one embodiment, orchestration component 158 instantiates virtual machines according to a requested template that defines one or more virtual machines having specified virtual computing resources (e.g., compute, networking, storage resources). Further, orchestration component 158 monitors the infrastructure resource consumption levels and requirements of cloud computing environment 170 and provides additional infrastructure resources to cloud computing environment 170 as needed or desired. In one example, similar to virtualized computing, system 102, virtualization environment 156 may be implemented by running on hosts 162 VMware ESX™-based hypervisor technologies provided by VMware, Inc. of Palo Alto, Calif. (although it should be recognized that any other virtualization technologies, including Xen® and Microsoft Hyper-V virtualization technologies may be utilized consistent with the teachings herein).

In one embodiment, cloud computing system 150 may include a cloud director 152 (e.g., run in one or more virtual machines) that manages allocation of virtual computing resources to an enterprise for deploying applications. Cloud director 152 may be accessible to users via a REST (Representational State Transfer) API (Application Programming Interface) or any other client-server communication protocol. Cloud director 152 may authenticate connection attempts from the enterprise using credentials issued by the cloud computing provider. Cloud director 152 maintains and publishes a catalog 166 of available virtual machine templates and packaged virtual machine applications that represent virtual machines that may be provisioned in cloud computing environment 170. A virtual machine template is a virtual machine image that is loaded with a pre-installed guest operating system, applications, and data, and is typically used to repeatedly create a VM having the pre-defined configuration. A packaged virtual machine application is a logical container of pre-configured virtual machines having software components and parameters that define operational details of the packaged application. An example of a packaged VM application is vApp™ technology made available by VMware, Inc., of Palo Alto, Calif., although other technologies may be utilized. Cloud director 152 receives provisioning requests submitted (e.g., via REST API calls) and may propagates such requests to orchestration component 158 to instantiate the requested virtual machines (e.g., VMs 172).

In the embodiment of FIG. 1, cloud computing environment 170 supports the creation of a virtual data center 180 having a plurality of virtual machines 172 instantiated to, for example, host deployed multi-tier applications. A virtual data center 180 is a logical construct that provides compute, network, and storage resources to an organization. Virtual data centers 180 provide an environment where VM 172 can be created, stored, and operated, enabling complete abstraction between the consumption of infrastructure service and underlying resources. VMS 172 may be configured similarly to VMs 120, as abstractions of processor, memory, storage, and networking resources of hardware resources 160.

Virtual data center 180 includes one or more virtual networks 182 used to communicate between VMs 172 and managed by at least one networking gateway component (e.g., gateway 184), as well as one or more isolated internal networks 186 not connected to gateway 184. Gateway 184 (e.g., executing as a virtual appliance) is configured to provide VMs 172 and other components in cloud computing environment 170 with connectivity to external network 140 (e.g., Internet). Gateway 184 manages external public IP addresses for virtual data center 180 and one or more private internal networks interconnecting VMs 172. Gateway 184 is configured to route traffic incoming to and outgoing from virtual data center 180 and provide networking services, such as firewalls, network address translation (NAT), dynamic host configuration protocol (DHCP), and load balancing. Gateway 184 may be configured to provide virtual private network (VPN) connectivity over a network 140 with another VPN endpoint, such as a gateway 124 within virtualized computing system 102. In other embodiments, gateway 184 may be configured to connect to communicate with virtualized computing system 102 using a high-throughput, dedicated link (depicted as a direct connect 142) between virtualized computing system 102 and cloud computing system 150. In one or more embodiments, gateways 124 and 184 are configured to provide a "stretched" layer-2 (L2) network that spans virtualized computing system 102 and virtual data center 180, as shown in FIG. 1.

While FIG. 1 depicts a single connection between on-premise gateway 124 and cloud-side gateway 184 for illustration purposes, it should be recognized that multiple connections between multiple on-premise gateways 124 and cloud-side gateways 184 may be used. Furthermore, while FIG. 1 depicts a single instance of a gateway 184, it is recognized that gateway 184 may represent multiple gateway components within cloud computing system 150. In some embodiments, a separate gateway 184 may be deployed for each virtual data center, or alternatively, for each tenant. In some embodiments, a gateway instance may be deployed that manages traffic with a specific tenant, while a separate gateway instance manages public-facing traffic to the Internet. In yet other embodiments, one or more gateway instances that are shared among all the tenants of cloud computing system 150 may be used to manage all public-facing traffic incoming and outgoing from cloud computing system 150.

In one embodiment, each virtual data center 180 includes a "hybridity" director module (depicted as hybridity director 174) configured to communicate with the corresponding hybrid cloud manager 132 in virtualized computing system 102 to enable a common virtualized computing platform between virtualized computing system 102 and cloud computing system 150. Hybridity director 174 (e.g., executing as a virtual appliance) may communicate with hybrid cloud manager 132 using Internet-based traffic via a VPN tunnel established between gateways 124 and 184, or alternatively, using direct connect 142. In one embodiment, hybridity director 174 may control gateway 184 to control network traffic into virtual data center 180. In some embodiments, hybridity director 174 may control VMs 172 and hosts 162 of cloud computing, system 150 via infrastructure platform 154.

Figure 2:
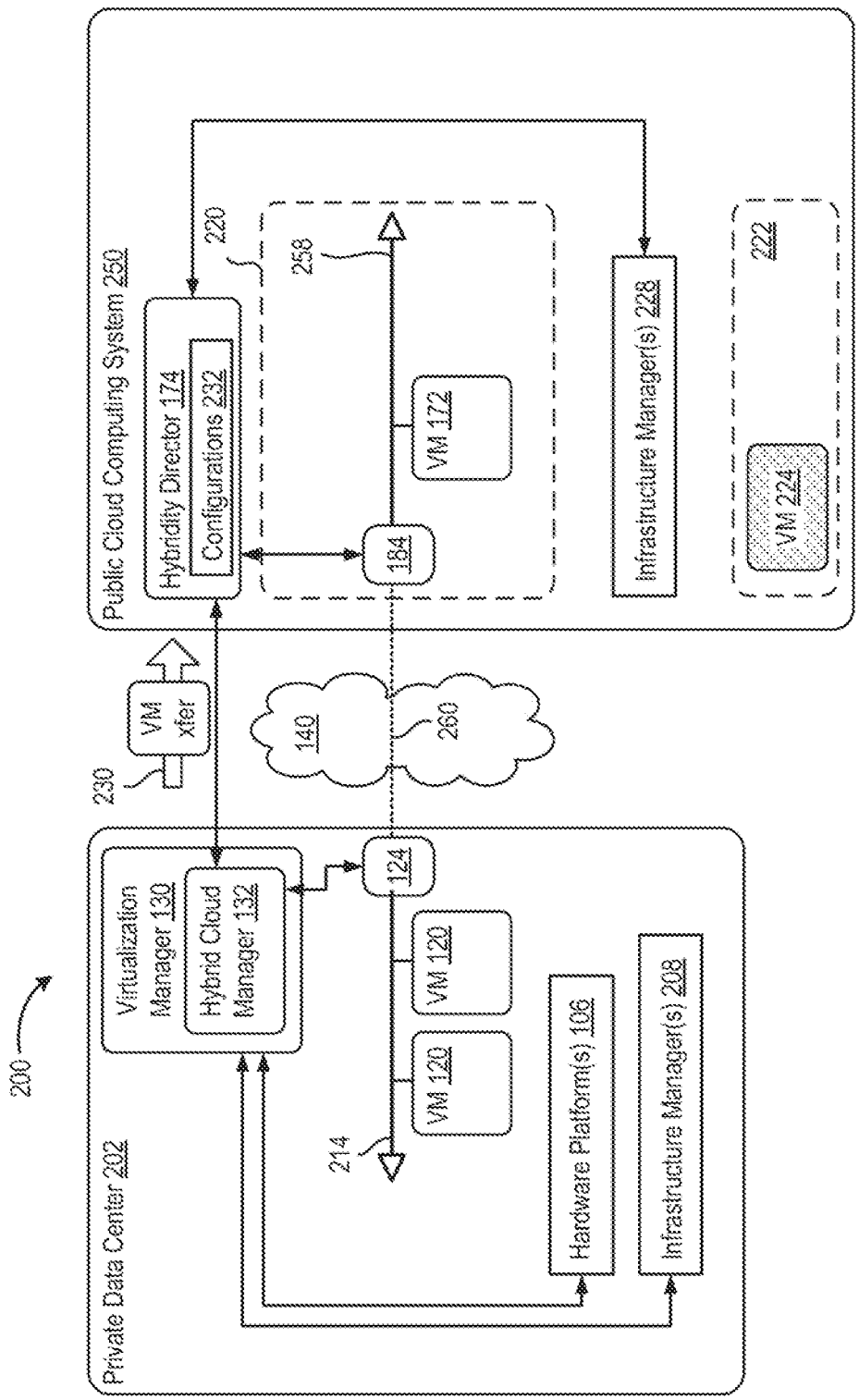
FIG. 2 is a block diagram depicting cross-cloud deployment operations of a hybrid cloud computing system, according to one embodiment of the present disclosure.

FIG. 2 is a block diagram depicting cross-cloud policy management operations of a hybrid cloud computing system 200, according to one embodiment of the present disclosure. Hybrid cloud computing system 200 is configured to provide a common platform for executing virtual workloads seamlessly between a private data center 202, which may be configured similar to virtualized computing system 102, and a public cloud computing system 250, which may be configured similar to cloud computing system 150 in FIG. 1. Private data center 202 may be managed by an enterprise (first organization), and the enterprise may be a tenant in public cloud computing system 250, which is managed by a cloud provider (second organization). For example, a virtual data center 220 within public cloud computing system 250 may be allocated to the enterprise as one tenant, while other virtual data centers 222 having other VMs 224 associated other tenants may be allocated in public cloud computing system 250.

During operation, hybrid cloud manager 132 (e.g., in response to user input) may migrate one or more VMs 120 to virtual data center 220. In some embodiments, hybrid cloud manager 132 may transfer one or more existing virtual computing resources (e.g., VM 208) from private data center 202 to virtual data center 220 (the operation being depicted by arrow 230 in FIG. 2). In other embodiments, hybrid cloud manager 132 may simply deploy additional virtual computing resources, such as VMs, virtual networks, and virtual storage, in virtual data center 220 for use by a virtual workload. As such, hybridity director 174 instantiates within virtual data center 220 a second VM 172 and a virtual network 258, which is a component of a stretched network combining with virtual network 214.

Embodiments of the present disclosure provide a mechanism to transfer policies and configurations for virtual objects in a private data center to create corresponding policies and configurations in a corresponding virtual data center in a public cloud computing system. In one or more embodiments, hybrid cloud manager 132 is configured to determine configurations of physical infrastructure of the private data center that underlies the virtual machine.

In some embodiments, hybrid cloud manager 132 may discover configurations of the physical infrastructure (e.g., hardware platform(s) 106) using a network discovery protocol that may be used to advertise the identity, capabilities, and neighbors of network devices, such as Link Layer Discovery Protocol. In other embodiments, hybrid cloud manager 132 may be query one or more infrastructure manager(s) 208, which are management modules (e.g., executing as an appliance) that provide infrastructure policies and configurations. Infrastructure managers 208 may be configured to connect to virtualization manager 130 via a supported extension that centralizes control of infrastructure components within private data center 202. Examples of an infrastructure manager 208 may be a storage array network (SAN) management module, such as VMware vSAN, or a virtualized network manager, such as VMware NSX, both made available from VMware, Inc. of Palo Alto, Calif. Infrastructure managers 208 may also be third-party provided components, such as an IT management network appliance that provides DHCP, DNS, and IP address management, such as Infoblox® Grid™ made available by Infoblox of Santa Clara, Calif. Another example of an infrastructure manager 208 may be a firewall appliance, such as those made available by Palo Alto Networks of Santa Clara, Calif.

Figure 3:
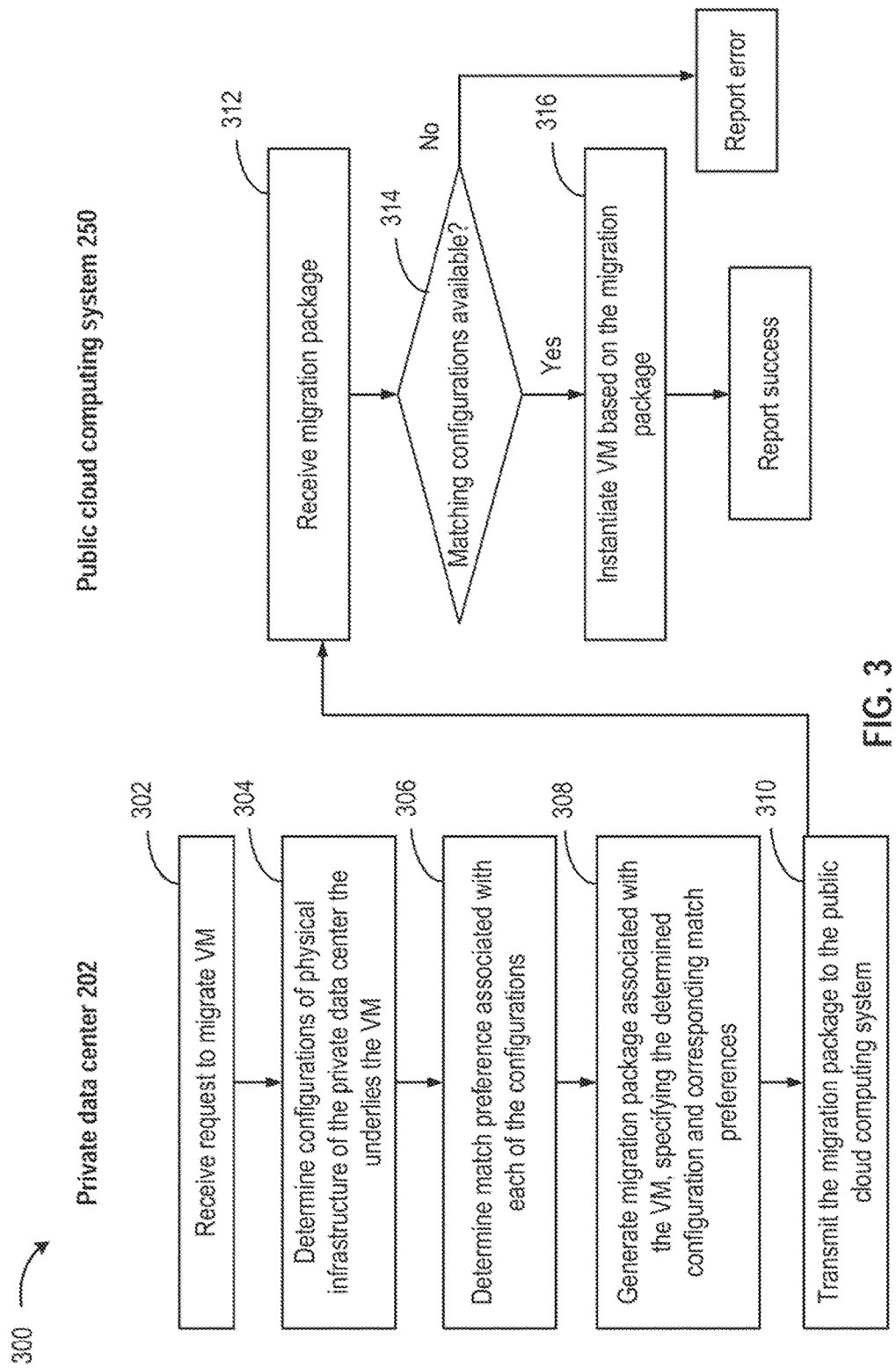
FIG. 3 is a flow diagram depicting a method for managing a hybrid cloud computing system, according to one embodiment of the present disclosure.

FIG. 3 is a flow diagram depicting a method 300 for managing a hybrid cloud computing system, according to one embodiment of the present disclosure. While method 300 is described in conjunction with components of the system shown in FIGS. 1 and 2, other components in computer systems 100 and 200 may perform the steps of method 300, as well as other systems may perform the described method.

Method 300 begins at step 302, hybrid cloud manager 132 receives a request to migrate a virtual machine from a private data center managed by a first organization enterprise) to a public cloud computing system. The first organization is a tenant in the public cloud computing system managed by a second organization (i.e., cloud provider). In one embodiment, the request to migrate may be received via user input.

At step 304, hybrid cloud manager 132 determines configurations of physical infrastructure of the private data center that underlies the virtual machine, and/or configurations of the virtual infrastructure associated with the virtual machine. Configurations of the physical infrastructure of the private data center that underlies the virtual machine may include at least one of network services settings (e.g., firewall rules), storage settings (e.g., input/output operations per second, or IOPS; NFS, iSCSI, or FibreChannel connection), and physical network interface settings (e.g., 1 GB link, 10 GB link, etc.) In some embodiments, hybrid cloud manager 132 discovers the configurations of the physical infrastructure using a link layer discovery protocol. In other embodiments, hybrid cloud manager 132 may query an infrastructure manager 208 associated with a component of the physical infrastructure for policies specifying the configurations. In one implementation, hybrid cloud manager 132 may query each infrastructure manager 208 using an appropriate REST API, netconf, or other interface, such as a CLI (i.e., command script with parsing output).

At step 306, hybrid cloud manager 132 determines a match preference associated with each of the configurations. In some embodiments, hybrid cloud manager 132 may present a user interface to a user that lists the plurality of discovered configurations associated with the migrated VM, and provides options to select a match preference for each configuration. Hybrid cloud manager 132 then receives user input indicating the match preference associated with each of the configurations of the physical infrastructure of the private data center that underlies the virtual machine.

In one or more embodiments, the match preferences indicate a level of criticality for some corresponding configuration at the public cloud system. The match preference may be a "must match" indication that signifies a second configuration at the public cloud computing system must match the first configuration, or a "best match" indication that signifies a best match between the first configuration and a second configuration at the public cloud computing system is permitted.

At step 308, hybrid cloud manager 132 generates a package associated with the migrated virtual machine. The package may include a metadata file indicating the configurations and corresponding match preferences. In one implementation, the package may be of a format configured for the packaging and distribution of virtual machines, such as the Open Virtualization Format (OVF). In such implementations, the discovered configurations and corresponding match preferences may be stored within a new namespace within one of the metadata files of the OVF file.

At step 310, hybrid cloud manager 132 transmits to public cloud computing system 250 the migration package associated with the migrating VM and specifying the determined configurations and corresponding match preferences. It is understood that the migration package associated with the migrating VM may include as part of the package, or be accompanied by as a separate package, state data of the migrating VM representing the execution state of the migrating VM.

At step 312, hybridity director 174 receives at public cloud computing system 250 the migration package associated with a first virtual machine. At step 314, hybridity director 174 retrieves a plurality of configurations and corresponding match preferences from the migration packages. At step 316 hybridity director 174 determines whether any configurations at public cloud computing system 250 are available based on the corresponding match preferences.

If so, at step 318, hybridity director 174 instantiates a (second) VM 172 within virtual data center 220 based on the migration package. The instantiated second VM 172 in virtual data center 220 corresponds to the migrated virtual machine in private data center 202. Hybridity director 174 may generate one or more configurations within public cloud computing system 250 using those matching configurations. That is, hybridity director 174 sets up a configuration within public cloud computing system 250 similar to that found within private data center 202, thereby providing a seamless transition between private data center 202 and public cloud computing system 250.

In one embodiment, for each configuration having a "best match" match preference specified in the migration package, hybridity director 174 identifies which configuration/policy providing is most similar to the settings of private data center 202 (e.g., network settings, storage settings). In some embodiments, the matching between configurations in private data center and public cloud computing system may be pre-determined. In another embodiment, for each configuration having a "must match" preference, hybridity director 174 identifies a configuration/policy within public cloud computing system 250 having providing substantially similar settings as the private data center configuration. If no such policy is available within public cloud computing system 250, hybridity director 174 may terminate the VM migration process and report an error back to hybrid cloud manager 132.

Certain embodiments as described above involve a hardware abstraction layer on top of a host computer. The hardware abstraction layer allows multiple contexts to share the hardware resource. In one embodiment, these contexts are isolated from each other, each having at least a user application running therein. The hardware abstraction layer thus provides benefits of resource isolation and allocation among the contexts. In the foregoing embodiments, virtual machines are used as an example for the contexts and hypervisors as an example for the hardware abstraction layer. As described above, each virtual machine includes a guest operating system in which at least one application runs. It should be noted that these embodiments may also apply to other examples of contexts, such as containers not including a guest operating system, referred to herein as "OS-less containers" (see, e.g., www.docker.com). OS-less containers implement operating system-level virtualization wherein an abstraction layer is provided on top of the kernel of an operating system on a host computer. The abstraction layer supports multiple OS-less containers each including an application and its dependencies. Each OS-less container runs as an isolated process in userspace on the host operating system and shares the kernel with other containers. The OS-less container relies on the kernel's functionality to make use of resource isolation (CPU, memory, block I/O, network, etc.) and separate namespaces and to completely isolate the application's view of the operating environments. By using OS-less containers, resources can be isolated, services restricted, and processes provisioned to have a private view of the operating system with their own process ID space, file system structure, and network interfaces. Multiple containers can share the same kernel, but each container can be constrained to only use a defined amount of resources such as CPU, memory and I/O. As used herein, the term "container" refers generically to both virtual machines and OS-less containers.

Although one or more embodiments have been described herein in some detail for clarity of understanding, it should be recognized that certain changes and modifications may be made without departing from the spirit of the disclosure. The various embodiments described herein may employ various computer-implemented operations involving data stored in computer systems. For example, these operations may require physical manipulation of physical quantities—usually, though not necessarily, these quantities may take the form of electrical or magnetic signals, where they or representations of them are capable of being stored, transferred, combined, compared, or otherwise manipulated. Further, such manipulations are often referred to in terms, such as producing, yielding, identifying, determining, or comparing. Any operations described herein that form part of one or more embodiments of the disclosure may be useful machine operations. In addition, one or more embodiments of the disclosure also relate to a device or an apparatus for performing these operations. The apparatus may be specially constructed for specific required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The various embodiments described herein may be practiced with other computer system configurations including hand-held devices, microprocessor systems, microprocessor-based or programmable consumer electronics, minicomputers, mainframe computers, and the like.

One or more embodiments of the present disclosure may be implemented as one or more computer programs or as one or more computer program modules embodied in one or more computer readable media. The term computer readable medium refers to any data storage device that can store data which can thereafter be input to a computer system—computer readable media may be based on any existing or subsequently developed technology for embodying computer programs in a manner that enables them to be read by a computer. Examples of a computer readable medium include a hard drive, network attached storage (NAS), read-only memory, random-access memory (e.g., a flash memory device), a CD (Compact Discs)—CD-ROM, a CD-R, or a CD-RW, a DVD (Digital Versatile Disc), a magnetic tape, and other optical and non-optical data storage devices. The computer readable medium can also be distributed over a network coupled computer system so that the computer readable code is stored and executed in a distributed fashion.

Although one or more embodiments of the present disclosure have been described in some detail for clarity of understanding, it will be apparent that certain changes and modifications may be made within the scope of the claims. Accordingly, the described embodiments are to be considered as illustrative and not restrictive, and the scope of the claims is not to be limited to details given herein, but may be modified within the scope and equivalents of the claims. In the claims, elements and/or steps do not imply any particular order of operation, unless explicitly stated in the claims.

Many variations, modifications, additions, and improvements are possible. Plural instances may be provided for components, operations or structures described herein as a single instance. Boundaries between various components, operations and data stores are somewhat arbitrary, and particular operations are illustrated in the context of specific illustrative configurations. Other allocations of functionality are envisioned and may fall within the scope of the disclosure(s). In general, structures and functionality presented as separate components in exemplary configurations may be implemented as a combined structure or component. Similarly, structures and functionality presented as a single component may be implemented as separate components. These and other variations, modifications, additions, and improvements may fall within the scope of the appended claim(s).

What is claimed is:

1. A method for managing a hybrid cloud computing system, the method comprising:
   at a hybrid cloud manager of a private data center of the hybrid cloud computing system, receiving a request to migrate a virtual machine from the private data center managed by a first organization to a public cloud computing system of the hybrid cloud computing system, wherein the first organization is a tenant in the public cloud computing system managed by a second organization;
   at the hybrid cloud manager of the private data center, determining configurations of physical infrastructure of the private data center that underlies the virtual machine, wherein the configurations of the physical infrastructure of the private data center that underlies the virtual machine comprise:
      network services settings that include firewall rules;
      storage settings that include input/output operations per second or a particular storage type; and
      physical network interface settings that include a link of a particular transmission rate;
   using the hybrid cloud manager of the private data center, presenting a user interface, which lists the configurations of the physical infrastructure of the private data center that underlies the virtual machine and provides options to select a match preference for each of the configurations, to a user;
   at the hybrid cloud manager of the private data center, receiving user input from the user indicating the match preference for each of the configurations of the physical infrastructure of the private data center that underlies the virtual machine; and
   from the hybrid cloud manager of the private data center, transmitting, to the public cloud computing system, a migration package associated with the virtual machine and specifying the determined configurations and corresponding match preferences and state data of the virtual machine representing an execution state of the virtual machine.

2. The method of claim 1, wherein the determining the configurations of physical infrastructure of the private data center that underlies the virtual machines further comprises:
   discovering the configurations of the physical infrastructure using a link layer discovery protocol.

3. The method of claim 1, wherein the determining the configurations of physical infrastructure of the private data center that underlies the virtual machines further comprises:
   querying an infrastructure manager associated with a component of the physical infrastructure for policies specifying the configurations.

4. The method of claim 1, further comprising:
   generating the migration package associated with the virtual machine, wherein the migration package comprises a metadata file indicating the configurations and corresponding match preferences.

5. A non-transitory computer-readable storage medium comprising instructions that, when executed in a computing device, manage a hybrid cloud computing system, by performing the steps of:
   at a hybrid cloud manager of a private data center of the hybrid cloud computing system, receiving a request to migrate a virtual machine from the private data center managed by a first organization to a public cloud computing system of the hybrid cloud computing system, wherein the first organization is a tenant in the public cloud computing system managed by a second organization;
   at the hybrid cloud manager of the private data center, determining configurations of physical infrastructure of the private data center that underlies the virtual machine, wherein the configurations of the physical infrastructure of the private data center that underlies the virtual machine comprise:
      network services settings that include firewall rules;
      storage settings that include input/output operations per second or a particular storage type; and
      physical network interface settings that include a link of a particular transmission rate;
   using the hybrid cloud manager of the private data center, presenting a user interface, which lists the configurations of the physical infrastructure of the private data center that underlies the virtual machine and provides options to select a match preference for each of the configurations, to a user;
   at the hybrid cloud manager of the private data center, receiving user input from the user indicating the match preference for each of the configurations of the physical infrastructure of the private data center that underlies the virtual machine; and
   from the hybrid cloud manager of the private data center, transmitting, to the public cloud computing system, a migration package associated with the virtual machine and specifying the determined configurations and corresponding match preferences and state data of the virtual machine representing an execution state of the virtual machine.

6. The non-transitory computer-readable storage medium of claim 5, wherein the determining the configurations of physical infrastructure of the private data center that underlies the virtual machines further comprises:
   discovering the configurations of the physical infrastructure using a link layer discovery protocol.

7. The non-transitory computer-readable storage medium of claim 5, wherein the determining the configurations of physical infrastructure of the private data center that underlies the virtual machines further comprises:
   querying an infrastructure manager associated with a component of the physical infrastructure for policies specifying the configurations.

8. The non-transitory computer-readable storage medium of claim 5, wherein the steps further comprise:
   generating the migration package associated with the virtual machine, wherein the migration package comprises a metadata file indicating the configurations and corresponding match preferences.

9. A system comprising:
   memory; and
   one or more processors configured to:
      at a hybrid cloud manager of a private data center of a hybrid cloud computing system, receive a request to migrate a virtual machine from the private data center managed by a first organization to a public cloud computing system of the hybrid cloud computing system, wherein the first organization is a tenant in the public cloud computing system managed by a second organization;

at the hybrid cloud manager of the private data center, determine configurations of physical infrastructure of the private data center that underlies the virtual machine, wherein the configurations of the physical infrastructure of the private data center that underlies the virtual machine comprise:

network services settings that include firewall rules;

storage settings that include input/output operations per second or a particular storage type; and physical network interface settings that include a link of a particular transmission rate;

using the hybrid cloud manager of the private data center, present a user interface, which lists the configurations of the physical infrastructure of the private data center that underlies the virtual machine and provides options to select a match preference for each of the configurations, to a user;

at the hybrid cloud manager of the private data center, receive user input from the user indicating the match preference for each of the configurations of the physical infrastructure of the private data center that underlies the virtual machine; and from the hybrid cloud manager of the private data center, transmit, to the public cloud computing system, a migration package associated with the virtual machine and specifying the determined configurations and corresponding match preferences and state data of the virtual machine representing an execution state of the virtual machine.

10. The system of claim 9, wherein the one or more processors are further configured to:

discover the configurations of the physical infrastructure using a link layer discovery protocol.

11. The system of claim 9, wherein the one or more processors are further configured to:

query an infrastructure manager associated with a component of the physical infrastructure for policies specifying the configurations.

12. The system of claim 9, wherein the one or more processors are further configured to:

generate the migration package associated with the virtual machine, wherein the migration package comprises a metadata file indicating the configurations and corresponding match preferences.

* * * * *